(12) United States Patent
Perkins et al.

(10) Patent No.: US 6,659,693 B1
(45) Date of Patent: Dec. 9, 2003

(54) PNEUMATIC TUBE DISTRIBUTION SYSTEM AND METHOD

(75) Inventors: James D. Perkins, Anaheim, CA (US); Dave Mathew Perkins, Corona, CA (US); Douglas Jeffrey Perkins, Corona, CA (US)

(73) Assignee: Advanced Pneumatic Tubes, Inc., Corona, CA (US)

( * ) Notice: Subject to any disclaimer, the term of this patent is extended or adjusted under 35 U.S.C. 154(b) by 0 days.

(21) Appl. No.: 10/154,181

(22) Filed: May 21, 2002

(51) Int. Cl.⁷ .............................................. B65G 53/08
(52) U.S. Cl. ............................ 406/62; 406/13; 406/182
(58) Field of Search ............................ 406/1, 181, 182, 406/2, 3, 4, 5, 6, 7, 8, 9, 13, 52, 62

(56) References Cited

U.S. PATENT DOCUMENTS

| | | | | |
|---|---|---|---|---|
| 600,536 A | * | 3/1898 | Johnson .......................... 406/2 |
| 1,733,026 A | * | 10/1929 | McGuinness et al. .......... 406/1 |
| 1,784,968 A | | 12/1930 | McGuiness |
| 2,703,687 A | | 3/1955 | Prietzel ....................... 243/29 |
| 2,773,658 A | | 12/1956 | Van Otteren et al. ........... 243/1 |
| 3,265,327 A | | 8/1966 | Mach .......................... 243/29 |
| 3,272,561 A | * | 9/1966 | Farnsworth et al. ........ 406/181 |
| 3,302,904 A | | 2/1967 | Buchwald ..................... 243/29 |
| 3,406,928 A | * | 10/1968 | Thorburn ....................... 406/2 |
| 3,627,231 A | * | 12/1971 | Kalthoff ........................ 406/3 |
| 4,058,274 A | | 11/1977 | Hochradel et al. ............. 243/5 |
| 4,063,572 A | * | 12/1977 | Anderegg et al. .......... 137/862 |
| 4,529,335 A | | 7/1985 | Hilbert et al. ................. 406/1 |
| 5,217,329 A | * | 6/1993 | Lang .......................... 406/176 |
| 5,709,506 A | | 1/1998 | Beard et al. ................... 406/1 |
| 5,846,029 A | | 12/1998 | Beard et al. ................... 406/1 |
| 5,846,030 A | | 12/1998 | Beard et al. ................... 406/1 |
| 6,074,136 A | | 6/2000 | Steele ........................ 406/182 |
| 6,516,810 B1 | * | 2/2003 | Haul .......................... 131/282 |

FOREIGN PATENT DOCUMENTS

| | | |
|---|---|---|
| DE | 41 01 257 A1 | 1/1992 |
| EP | 0 063 255 | 3/1982 |
| GB | 2 100 694 A | 6/1982 |

\* cited by examiner

Primary Examiner—Joseph A. Dillon
(74) Attorney, Agent, or Firm—Richard L. Myers; Myers Dawes Andras & Sherman LLP (57) ABSTRACT

A pneumatic system for transporting a carrier includes a first transport tube coupled to a first transport station and a second transport tube coupled to a second transport station. A distributor coupled to the first transport tube and the second transport tube includes a carousel having at least one storage chamber. The carousel is rotatable about an axis to align the storage chamber with the first transport tube and the second transport tube. A source of airflow coupled to the distributor facilitates movement of the carrier through the first transport tube and into the storage chamber of the carousel, and facilitates movement of the carrier from the storage chamber of the carousel into the second transport tube. An associated method for transporting the carrier includes the step of moving the carrier from the first transport tube in a first direction into the storage chamber of the distributor. The distributor is then rotated with a carrier in the storage chamber, and the carrier is moved from the storage chamber in a second direction opposite to the first direction and into the second transport tube.

19 Claims, 14 Drawing Sheets

PNEUMATIC TUBE DISTRIBUTION SYSTEM AND METHOD

BACKGROUND OF THE INVENTION

1. Field of the Invention

This invention relates generally to pneumatic tube systems for transporting carriers and more specifically to those systems which transport carriers between operating zones.

2. Discussion of the Relevant Art

Pneumatic carrier transport systems include at least two stations where carriers can be input to the system and received from the system. In a simple system, pneumatic power provides a fluid pressure or fluid vacuum at each of the stations. This pneumatic power is applied to a tube system which interconnects the stations. In a typical operation, a carrier is inserted into the tube system at one of the stations. Pressure is applied behind the carrier or vacuum is applied in front of the carrier in order to move the carrier through a distribution tube from the initial station to the ultimate station.

In more complex systems, many stations are divided into individual zones. A head diverter associated with each of the zones is in turn coupled through an associated secondary diverter which accesses the other zones. For example, a carrier initially input at a sending zone is held in a stopping chamber and then introduced through the head diverter associated with the sending zone. From the head diverter, the carrier is passed to a secondary diverter also associated with the sending zone and transported to a secondary diverter associated with the receiving zone. The carrier is then transported between the secondary diverter and the head diverter at the receiving zone.

In such a system it can be appreciated that numerous zones can be accommodated, but only with a vast amount of equipment including stopping chambers, head diverters, and secondary diverters. In addition, various slide gates and/or relief valves are required in this type of system. As a consequence, the cost of this system, merely based on the equipment requirements, is significant. Furthermore, the size of the hardware is relatively large and may require as much as 1,000 square feet merely to accommodate a simple six-zone system. Since these systems are commonly used in hospitals and other expensive environments, square footage is at a premium and merely increases the cost of these large systems. The large equipment requirements also result in high maintenance and operation costs.

The complexity of this system and the amount of time required to accomplish the various transmission steps, significantly reduces the overall throughput of the system. This throughput is further reduced by the fact that interzone connections are dedicated between each pair of connecting zones.

SUMMARY OF THE INVENTION

In accordance with the present invention, a single rotary carrier distributor is connected to distribution tubes which lead directly to the individual zones. Thus a single distributor might include six separate tubes each communicating with one of six separate zones of the system. Within the distributor each of these zone distribution tubes is coupled through a rotary receiver valve to a rotatable interzone storage device including for example, twelve non-dedicated storage containers.

During operation of the distribution, a carrier may be received through one of the distribution zone tubes and input, with appropriate valving and pneumatic control, into one of the storage containers. The storage device is then rotated to bring the particular storage container into alignment with the distribution tube associated with the receiving zone. Again with appropriate valving and pneumatic control, the carrier is moved from the storage container and into the distribution tube associated with the receiving zone.

Initially it will be noted that the single distributor is the only equipment required for the accommodation of all of the zones. A reduction in the amount of equipment required for distribution is particularly apparent in the initial cost of the distributor. A reduction in the required equipment also results in lower maintenance and operational costs. The single distributor occupies a significantly reduced square footage of space, for example 300 square feet in the case of a six-zone distributor.

With a reduction in the complexity of the equipment, this greatly increases the throughput of the system. Future expansion is also facilitated by this system which accommodates the addition of further distributors with minimum modification.

In comparison to the systems of the past, it will be noted that equipment relating to stopping chambers, slide gates, relief valves, head diverters and secondary diverters is not required.

These and other features and advantages of the invention will become more apparent with a description of preferred embodiments and reference to the associated drawings.

DESCRIPTION OF THE DRAWINGS

FIG. 5–FIG. 13 are elevation cross-section views taken along lines V—V of FIG. 3 and illustrating sequential steps in the operation of the subassembly associated with the sending zone;

DESCRIPTION OF THE PREFERRED EMBODIMENTS AND BEST MODE OF THE INVENTION

Figure 1:
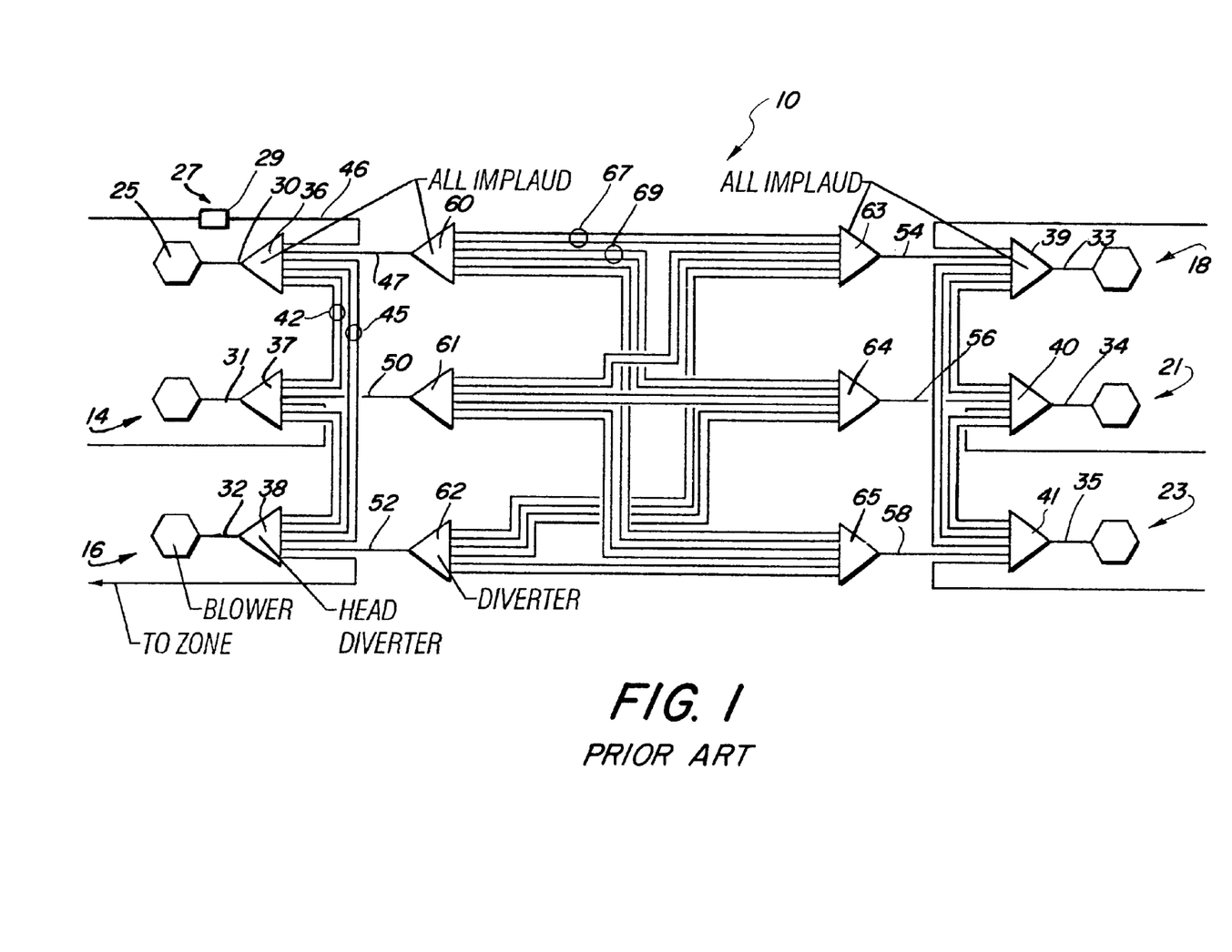
FIG. 1 is a schematic view of a conventional diverter system associated with the prior art.

A pneumatic transport system associated with the prior art is illustrated in FIG. 1 and designated by the reference numeral 10. This system includes a multiplicity of individual stations which are combined into six individual zones shown generally by reference numerals 12, 14, 16, 18, 21 and 23. Each of the zones, such as the zone 12, includes a blower 25 which alternatively provides pneumatic pressure or vacuum at the associated zone. The blower 25 is coupled through a stopping chamber 27 where a carrier 29 can be input to or received from the system 10. The stopping chamber 27 is in turn connected to a transport tube 30 associated with the zone 12. In FIG. 1, transport tubes 31, 32, 33, 34 and 35 are illustrated for the other zones 14, 16, 18, 21, and 23, respectively.

In a typical operation, the carrier 29 is moved under pressure into the transport tube 30 which is coupled through a head diverter 36 to the remainder of the system 10. Similar head diverters 37, 38, 39, 40 and 41 are associated with the zones 14, 16, 18, 21 and 23, respectively.

The head diverter 36 is connected to the single transport tube 30 on one side, but provides multiple connections to the remainder of the system 10 on the other side. For example, in the illustrated system, the head diverter 36 is connected on the other side to six individual tubes, including two tubes 43 which are connected to the adjacent zone 14, and two tubes 45 which are connected to the adjacent zone 16. A fifth tube 46 is connected to the associated zone 12, while a sixth tube (referred to as a secondary distribution tube 47) is connected to the remainder of the system 10. Secondary distribution tubes similar to the tube 47, are provided for each of the zones 14, 16, 18, 21 and 23 and designated by the respective reference numerals 50, 52, 54, 56 and 58.

A secondary diverter 60 associated with the zone 12 is connected to the secondary distribution tube 47 on one side. On its other side, the secondary diverter 60 is coupled through six secondary tubes to the remainder of the system. Similar secondary diverters designated by the reference numerals 61, 62, 63, 64 and 65 are associated with the zones 14, 16, 18, 21 and 23, respectively.

The secondary diverter 60 has the single tube 47 on one side and six tubes on the other side. These six tubes are connected, two each, to the secondary diverters 63, 64 and 65 associated with the zones 18, 21 and 23, respectively.

In a typical operation intended to move the carrier 29 from the zone 12 to the zone 18, for example, the carrier 29 is initially positioned within the stopping chamber 27. The carrier 29 is then moved under pneumatic pressure from the distribution tube 30 and into the head diverter 36. From this location, the carrier 29 is distributed to the tube 47 and into the secondary diverter 60. The carrier 29 is then moved from the secondary diverter associated with the zone 12 and through one of the tubes 67 into the secondary diverter 63 associated with the zone 18. This movement is accomplished partially by pressure from the zone 12 and partially by vacuum at the zone 18. Within the secondary diverter 63, the carrier 29 is drawn into the secondary distribution tube 54 and into the head diverter 39 and associated stopping chamber at the zone 18.

The complexity associated with this system of the prior art is readily apparent given the number of stopping chambers, head diverters, and secondary diverters which are required for each of the zones. Slide gates and relief valves associated with operation of this system are not shown but add significantly to the initial cost, as well as the maintenance and operation costs associated with this system.

Figure 2:
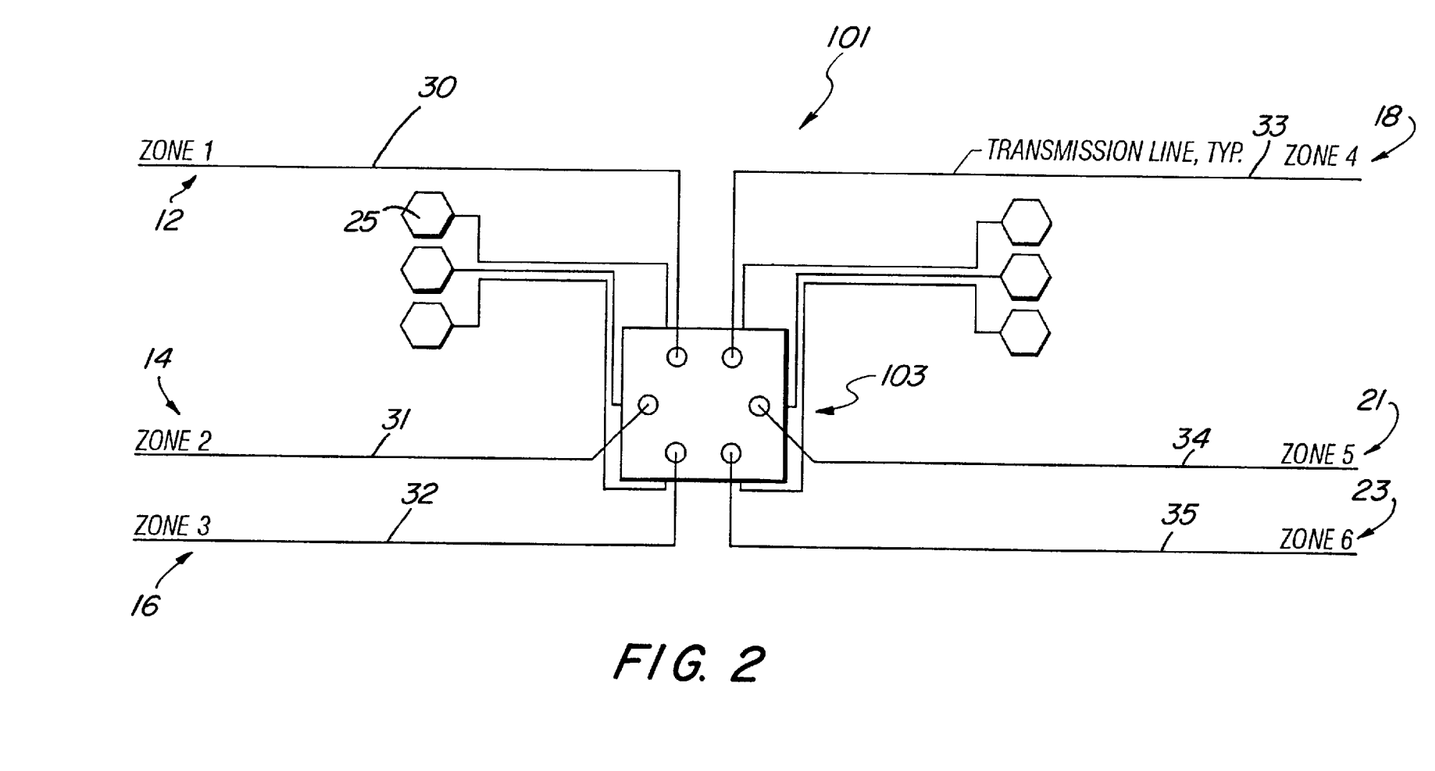
FIG. 2 is a schematic view of a system of the present invention including an interzone distributor showing six zones.

The system 10 of the prior art is to be compared with a system 101 which is associated with the present invention, and shown schematically in FIG. 2. In this embodiment, the transport tubes 30–35 associated with the zones 12–23, respectively, are coupled to a single rotary distributor 103 of the present invention. The individual blowers, such as the blower 25, associated with the respective zones 12–23, are also illustrated in FIG. 2.

Figure 3:
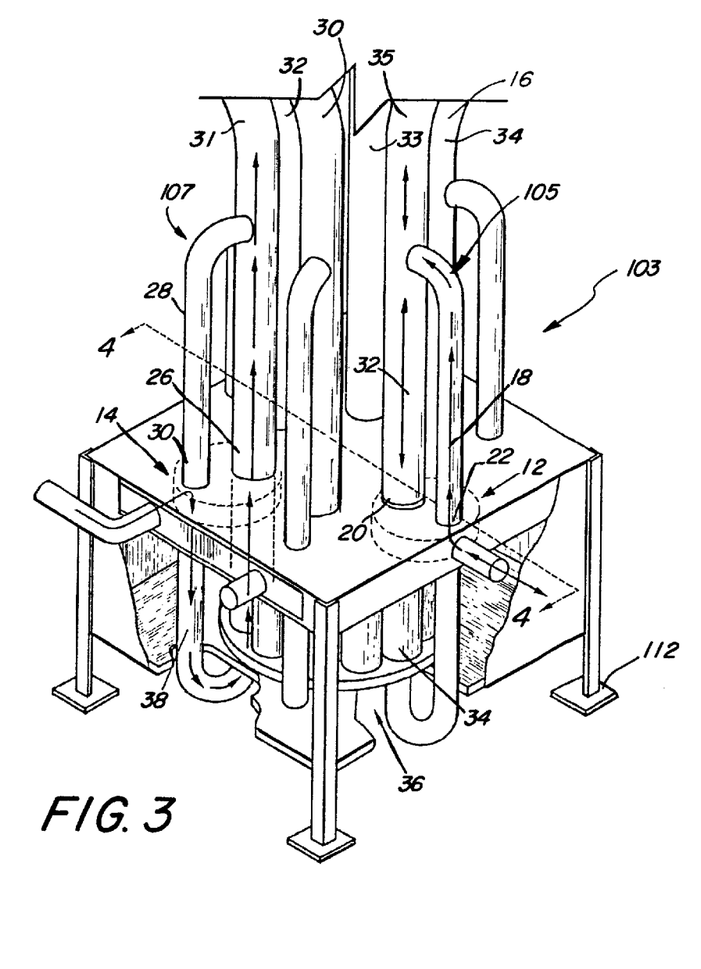
FIG. 3 is a schematic view of the interzone distributor including a rotary receiver valve and tubing associated with each of the zones.

In the distributor 103, shown in the perspective view of FIG. 3, each of the zones 12–23 is represented by a subassembly which is circumferentially spaced and radially oriented with respect to the other subassemblies. For example, a subassembly 105 is associated with the zone 23 and the transport tube 35. A similar subassembly 107 is associated with the zone 14 and the transport tube 31. The six subassemblies are mounted relative to a box 110 which has a top 111 and is supported by legs 112. These legs 112 define the footprint of the entire distributor 103 which may be only twenty square feet, for example.

Figure 4:
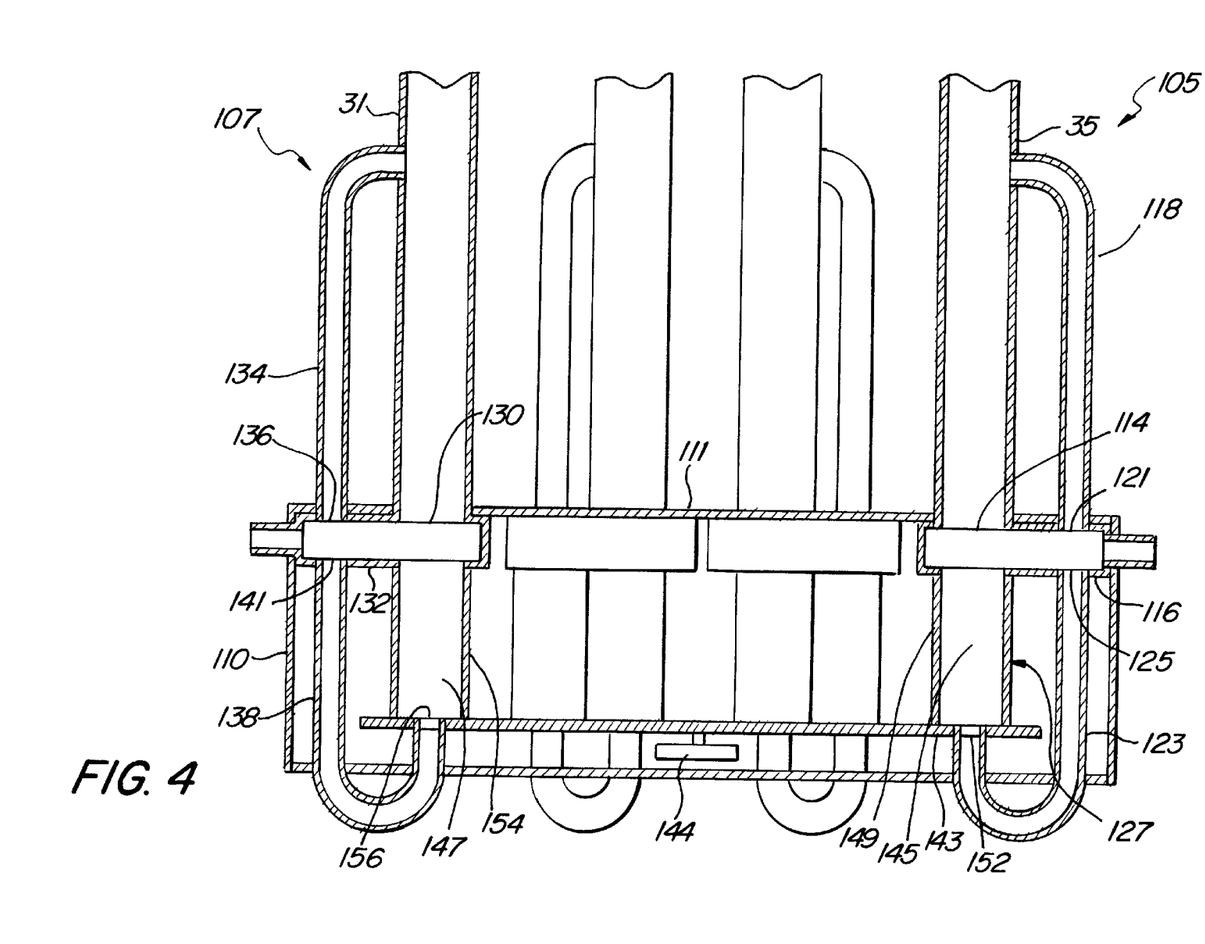
FIG. 4 is a cross-section view taken along lines IV—IV of FIG. 3, to illustrate operation of distribution subassemblies associated with each of a sending zone and a receiving zone.

The common configuration associated with the subassemblies, such as the subassemblies 105 and 107 is best illustrated in the cross-sectional view of FIG. 4. This common configuration is primarily defined by the associated transport tube, for example the tube 35 associated with zone 23. This tube 35 is supported by the box 110 and extends through the top 111. Within the box 110, the transport tube 35 communicates through a rotary valve 114 with a manifold 116. The manifold is also coupled through the box 110 to the associated blower.

A first pneumatic conduit 118 communicates at one of its ends with the transport tube 35. This connection is made at a point above the top 111 of the box 110. At its opposite end, the conduit 118 communicates through an air valve 121 with the manifold 116. A second pneumatic conduit 123 communicates with the manifold 116 through an air valve 125. At its other end, the conduit 123 communicates with an indexing storage unit 127 which rotates within the box 110. In a preferred embodiment, rotation of the storage unit 127 is accomplished with a computer controlled indexing motor 144.

In the subassembly 107, the common configuration is represented by the distribution tube 31, a rotary valve 130, a manifold 132, a first pneumatic conduit 134 with associated air valve 136, and a second pneumatic conduit 138 with associated air valve 141.

The storage unit 127 includes a carousel or table 143 which is rotatable within the box 110 and relative to the subassemblies, such as the subassemblies 105 and 107. Mounted on the rotatable table 143 are a plurality of storage chambers two of which are designated by the reference numerals 145 and 147. These storage units will typically number more than the zones accommodated by the distributor 103. In a preferred embodiment, which accommodates six zones, there are twelve storage chambers, such as the chambers 145 and 147. Importantly, the storage chambers are not dedicated to any of the zones or subassemblies, such as the subassemblies 105 and 107. Rather, they are available for use by any of the zones or subassemblies.

Each of the storage chambers is defined by an enclosure which is movable into communication with the manifold and the conduits of each subassembly. For example, in the illustrated embodiment, an enclosure 149 defines the storage chamber 145 and is positioned to communicate at one end with the manifold 116, and to communicate at the other end (through a hole 152 in the table 143) with the conduit 123.

Figure 5:
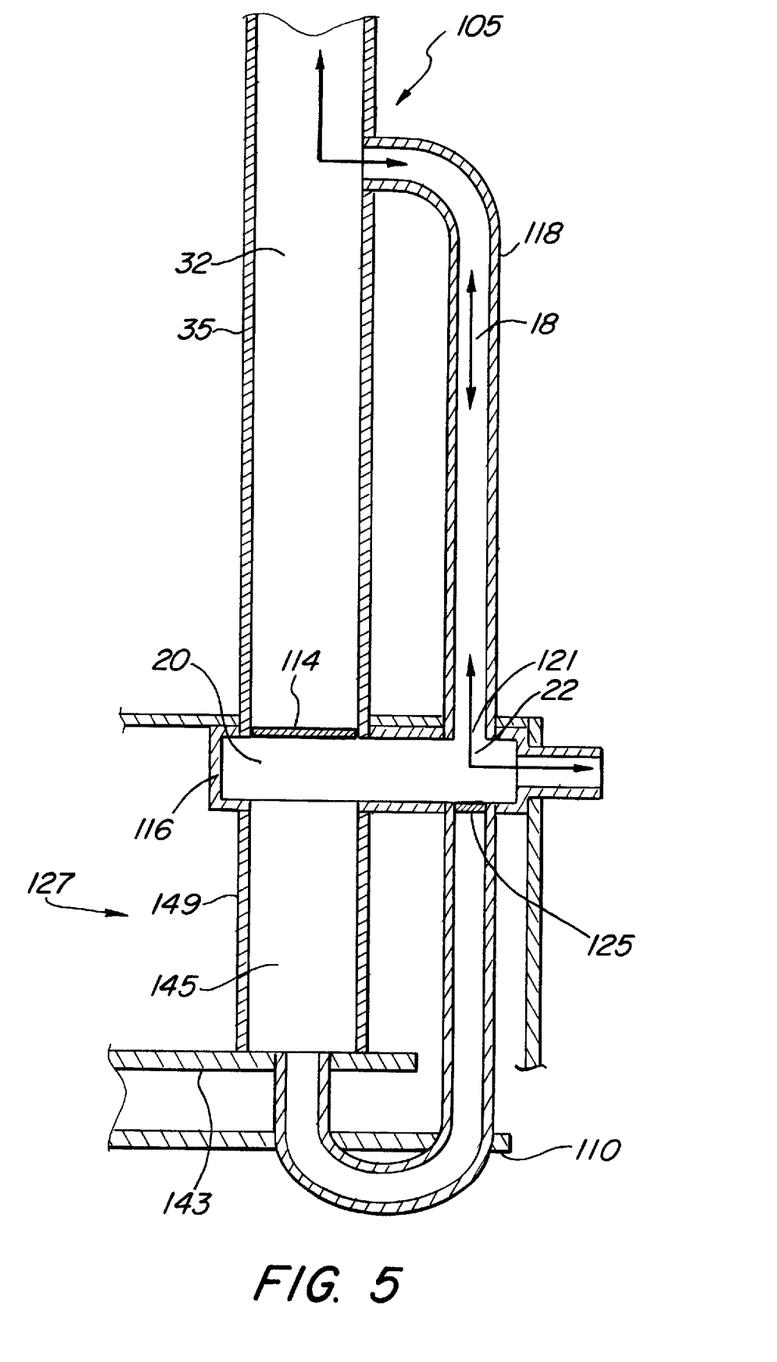
FIG. 5 is a cross-sectional view showing the distribution subassembly associated with the sending zone and including a rotary valve associated with the zone tube, a first air valve associated with a first pneumatic conduit, and a second air valve associated with a second pneumatic conduit.

Operation of the distributor 103 can best be understood with reference to FIGS. 5–13 which follow the carrier 29 from the transport tube 35 associated with the zone 23, through the distributor 103, and into the transport tube 31 associated with zone 14. FIG. 5 illustrates the subassembly 105 with the table 143 appropriately indexed to align the enclosure 149 and storage chamber 145 with the distribution tube 35. Also illustrated are the rotary valve 114 associated with the distribution tube 35, the air valve 121 associated with the pneumatic tube 118, and the air valve 125 associated with the pneumatic tube 123.

Figure 6:
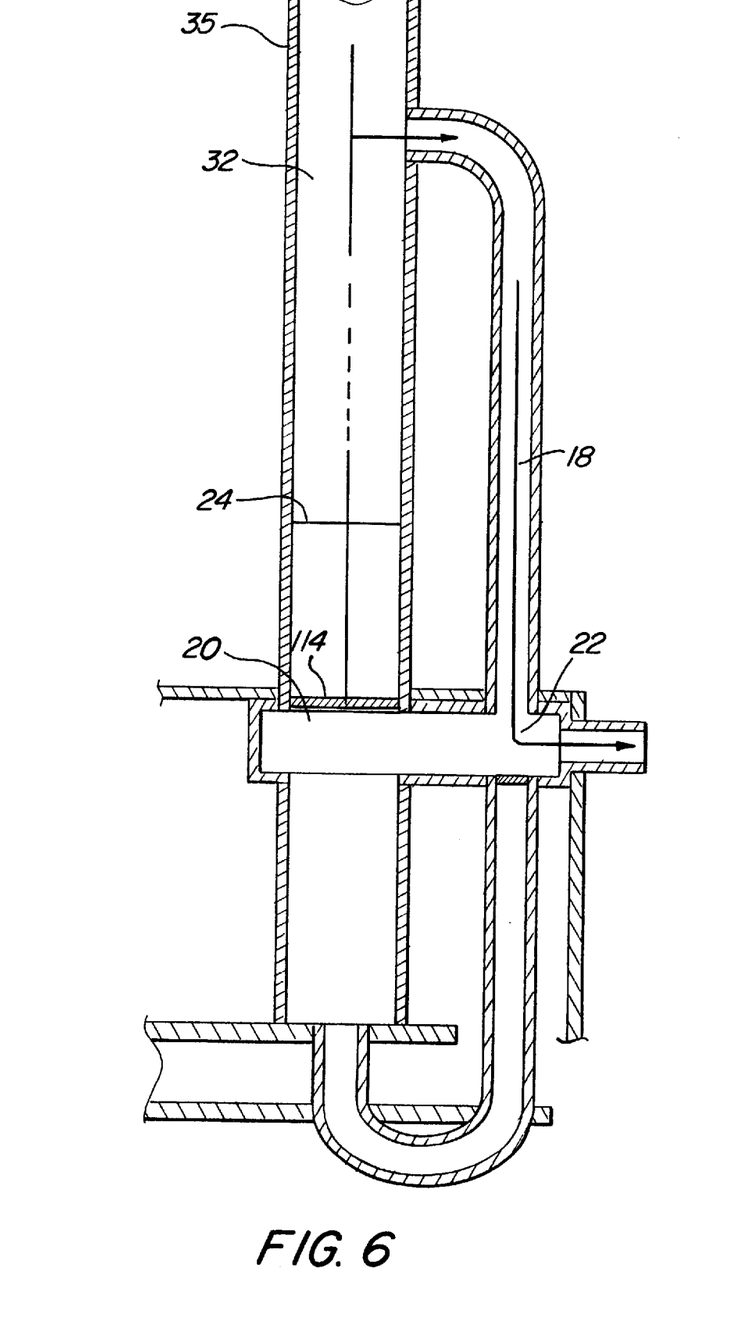
FIG. 6 is a cross-sectional view illustrating movement of a carrier through the zone tube and into proximity with the rotary valve.

In FIG. 5, the subassembly 105 is illustrated at a stage when the carrier 29 has been input to the transport tube 35 at zone 23 for transmission through the transport tube 31 to zone 14. With the carrier 29 present in the transport tube 35, vacuum is applied by the associated blower to the manifold 116. With the rotary valve 114 and air valve 125 closed, and the air valve 121 open, the vacuum in the manifold 116 is applied through the pneumatic conduit 118 to the transport tube 35. This vacuum draws the carrier 29 along the transport tube 35 and toward the rotary valve 114. As the carrier 29 enters the subassembly 105, it falls by gravity to the bottom of the transport tube 35 into proximity with the rotary valve 114. This position of the carrier 29 is illustrated in FIG. 6.

Figure 7:
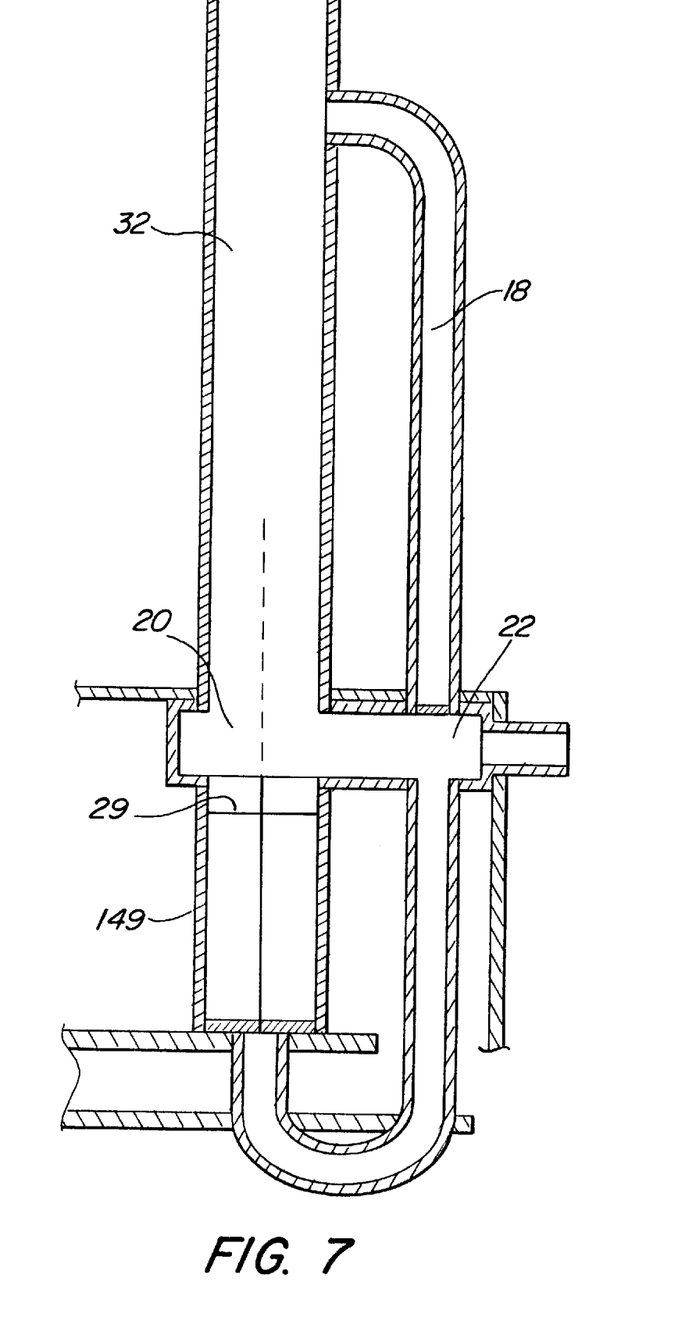
FIG. 7 is a cross-section view illustrating movement of the carrier through the rotary valve and into a storage container associated with the inner zone storage device.
Figure 8:
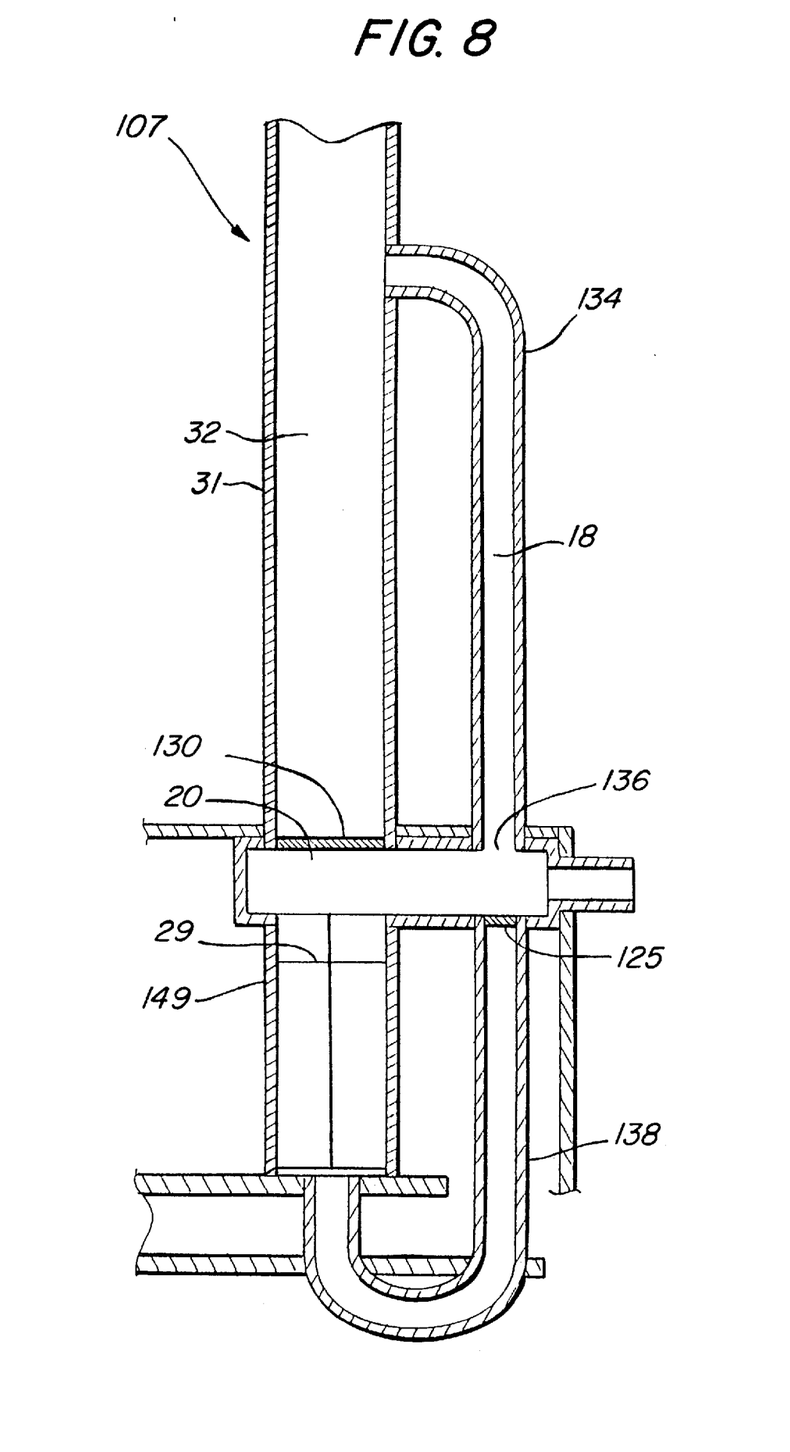
FIG. 8 is a cross-section view illustrating the carrier in an indexing drum.

At this point, the vacuum can be discontinued and the rotary valve 114 opened to permit the carrier 29 to drop into the storage chamber 145 associated with the indexing unit 127. With the carrier 29 appropriately stored within the enclosure 149, as shown in FIG. 7, the rotary valve 14 closes, permitting zone 23 to transport the next carrier. The table 143 can be rotated or indexed under computer control by the indexing motor 144. As the table 143 rotates, the enclosure 149 and stored carrier 29 are brought into alignment with the transport tube 31 associated with zone 14. This step in the process is illustrated in FIG. 8.

Figure 9:
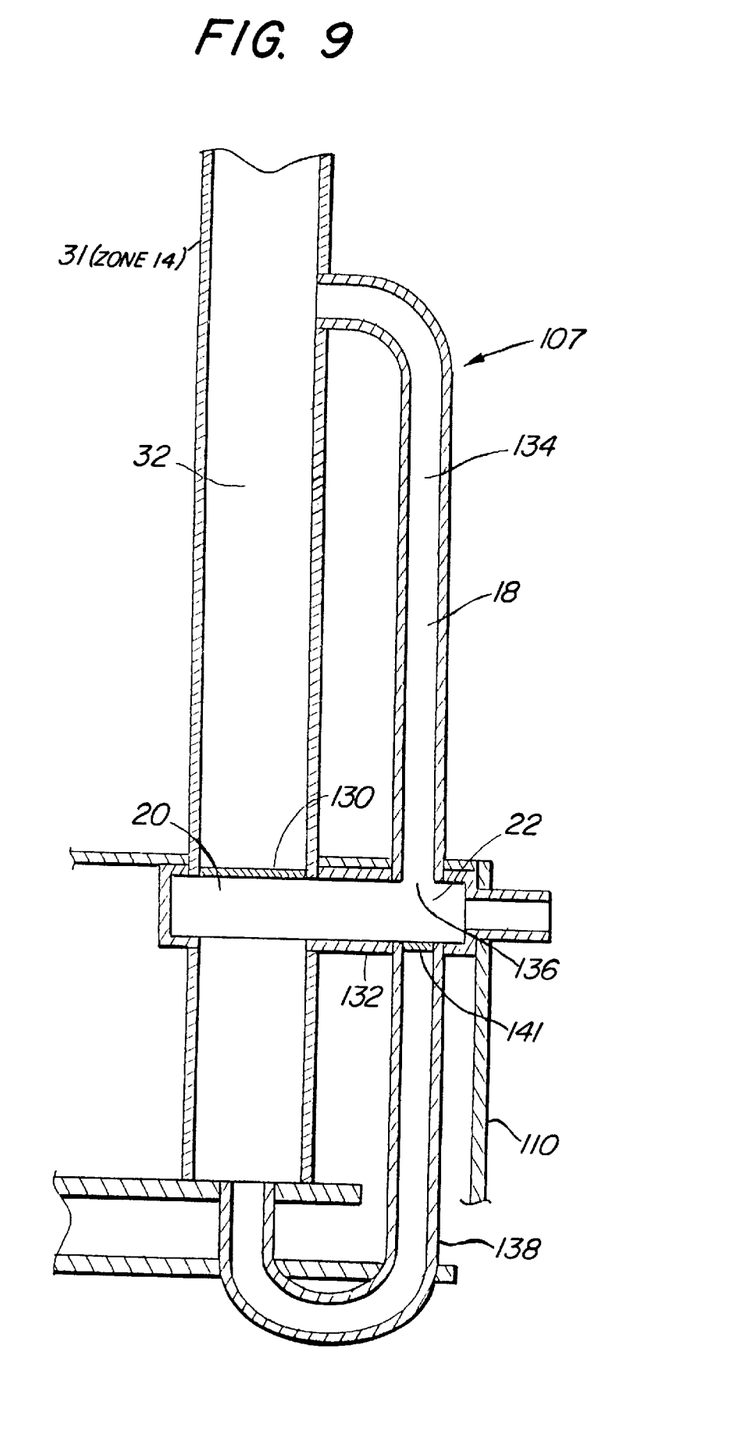
FIG. 9 is a cross-section view illustrating the carrier in the indexing drum and positioned for rotation to the subassembly associated with the receiving zone.
Figure 10:
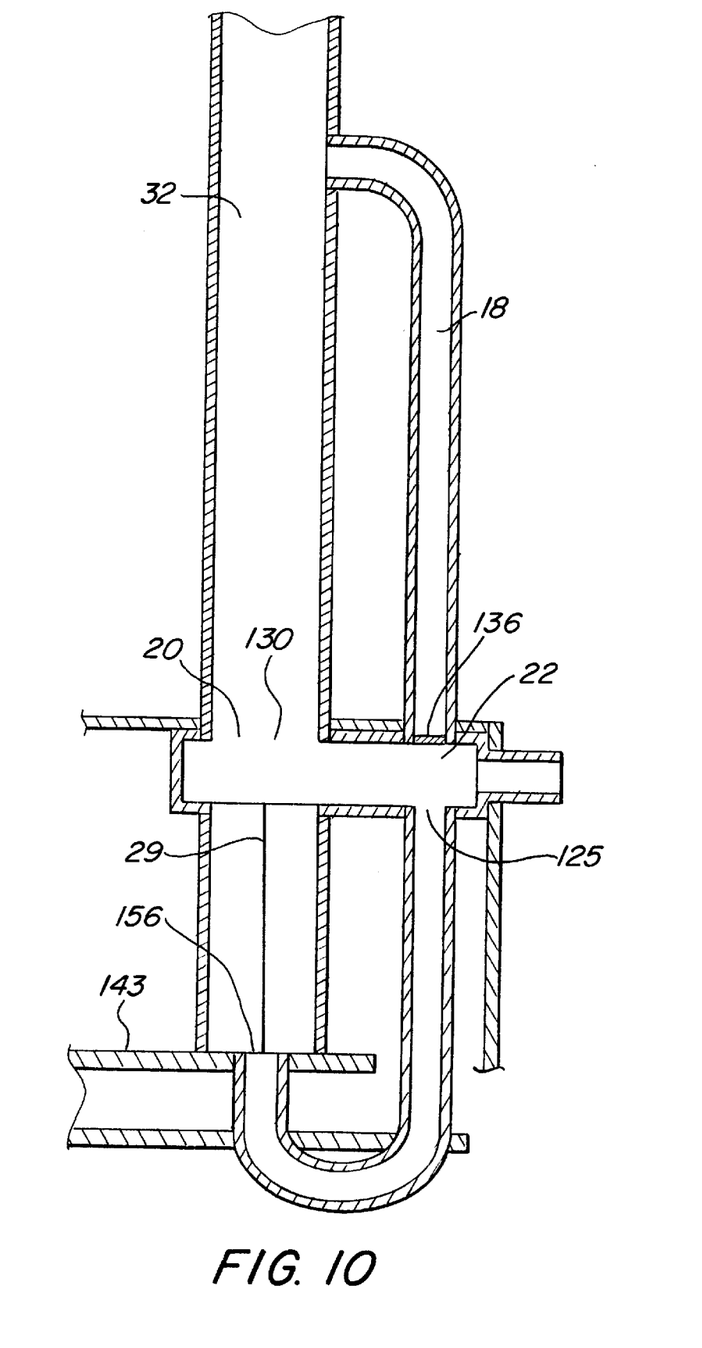
FIG. 10 is a cross-section view showing the carrier in the indexing drum at the subassembly associated with the receiving zone.
Figure 11:
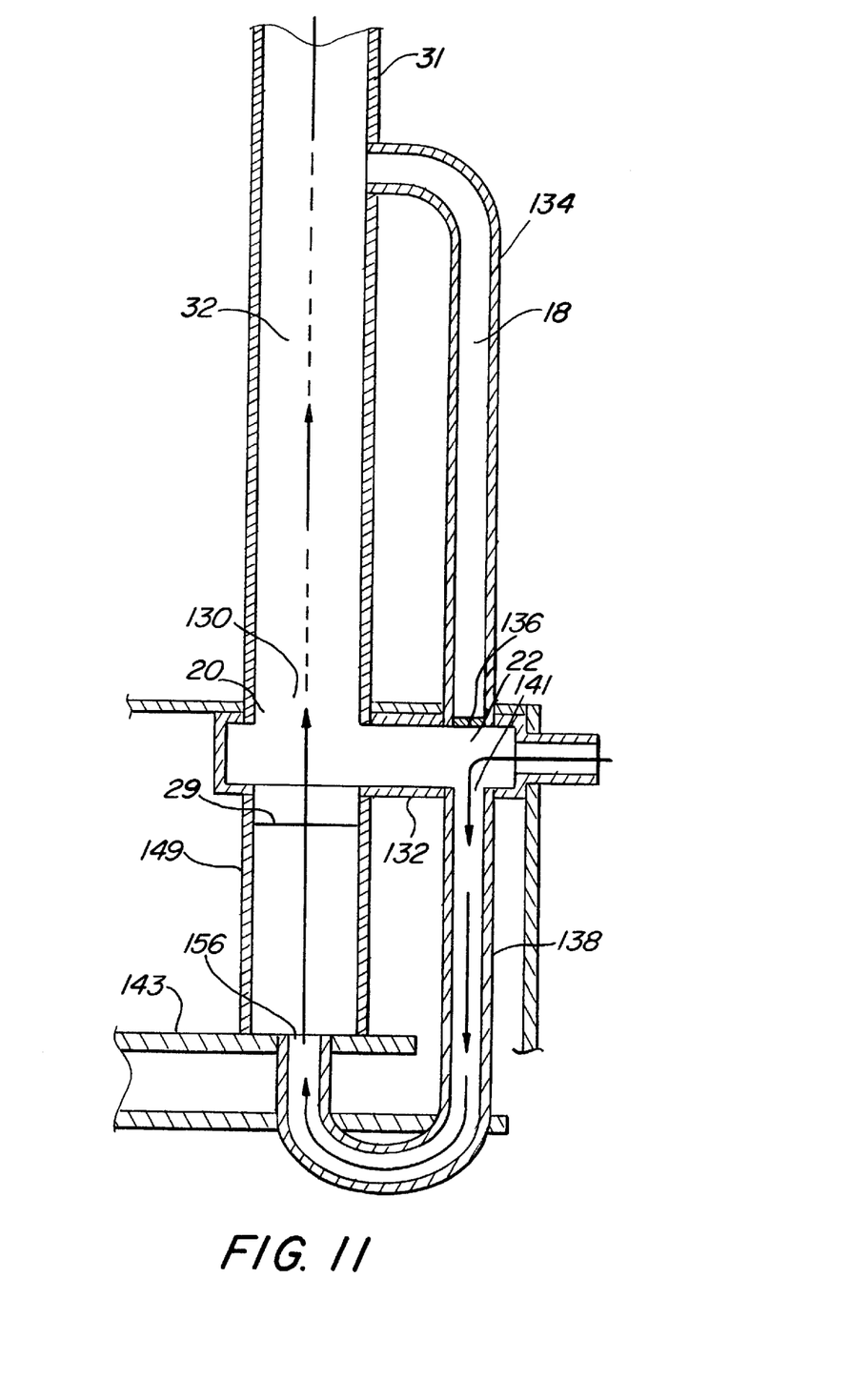
FIG. 11 is a cross-section view illustrating pneumatic pressure being applied to the second conduit to force the carrier from the indexing drum and into the distribution tube associated with the receiving zone.

At the subassembly 107, the rotary valve 130 and air valve 125 are initially closed, while the air valve 136 is open as illustrated in FIG. 9. With the enclosure 149 and stored carrier 29 appropriately positioned, the air valve 136 can be closed and the air valve and rotary valve 130 can be opened as shown in FIG. 10. The blower in zone 14 can then be activated to apply pneumatic pressure to the manifold 132. This pressure in the manifold 132 will be applied through the air valve 141 and the conduit 138 as illustrated in FIG. 11. The pressure will in turn be applied through the hole 156 in the table 143 to expel the carrier 29 from the enclosure 149, through the open rotary valve 130, and into the transport tube 31.

Figure 12:
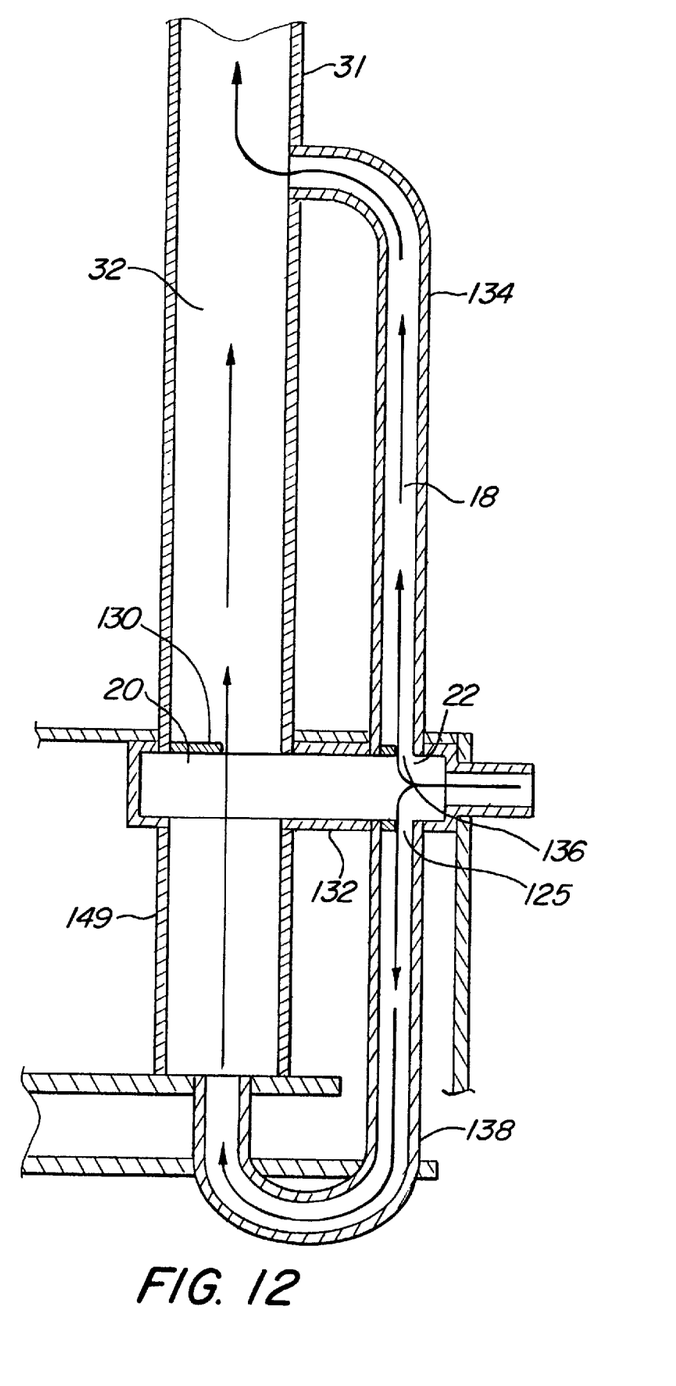
FIG. 12 is a cross-sectional view illustrating closure of the rotary valve and the transfer of pneumatic pressure from the second conduit to the first conduit.
Figure 13:
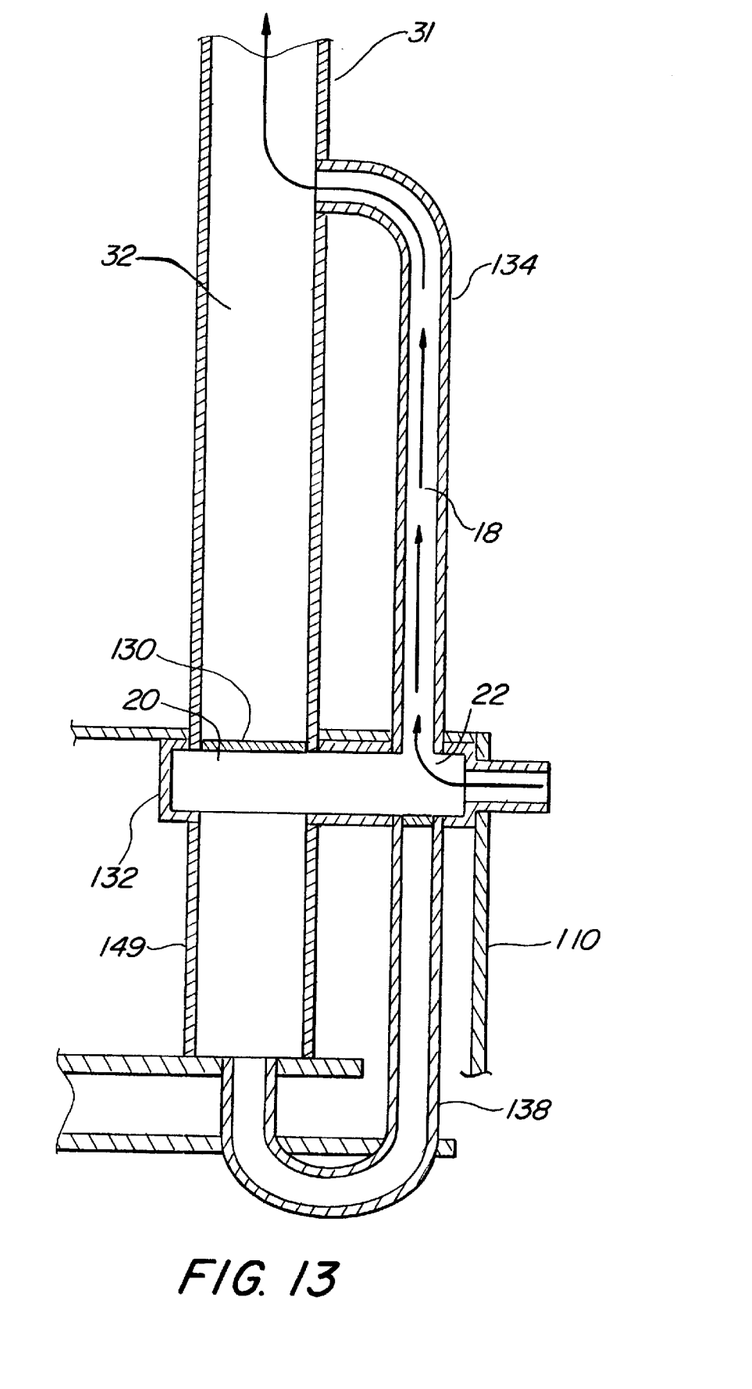
FIG. 13 is a cross-sectional view illustrating pneumatic pressure applied through the first conduit to force the carrier along the distribution tube associated with the receiving zone.

After the carrier 29 has moved upwardly through the transport tube 31 beyond the pneumatic conduit 134, the rotary valve 130 can be closed along with the air valve 141, and the air valve 136 can be opened. This will divert the pressure from the manifold 132 into the pneumatic conduit 134 and upwardly into the transport tube 31. As illustrated in FIG. 12, pressure can now be continuously applied through the conduit 134 to move the carrier 29 along the transport tube 31 while permitting the storage unit 127 to index to another transport tube within the distributor 103. This final step in the process is illustrated in FIG. 13.

Figure 14:
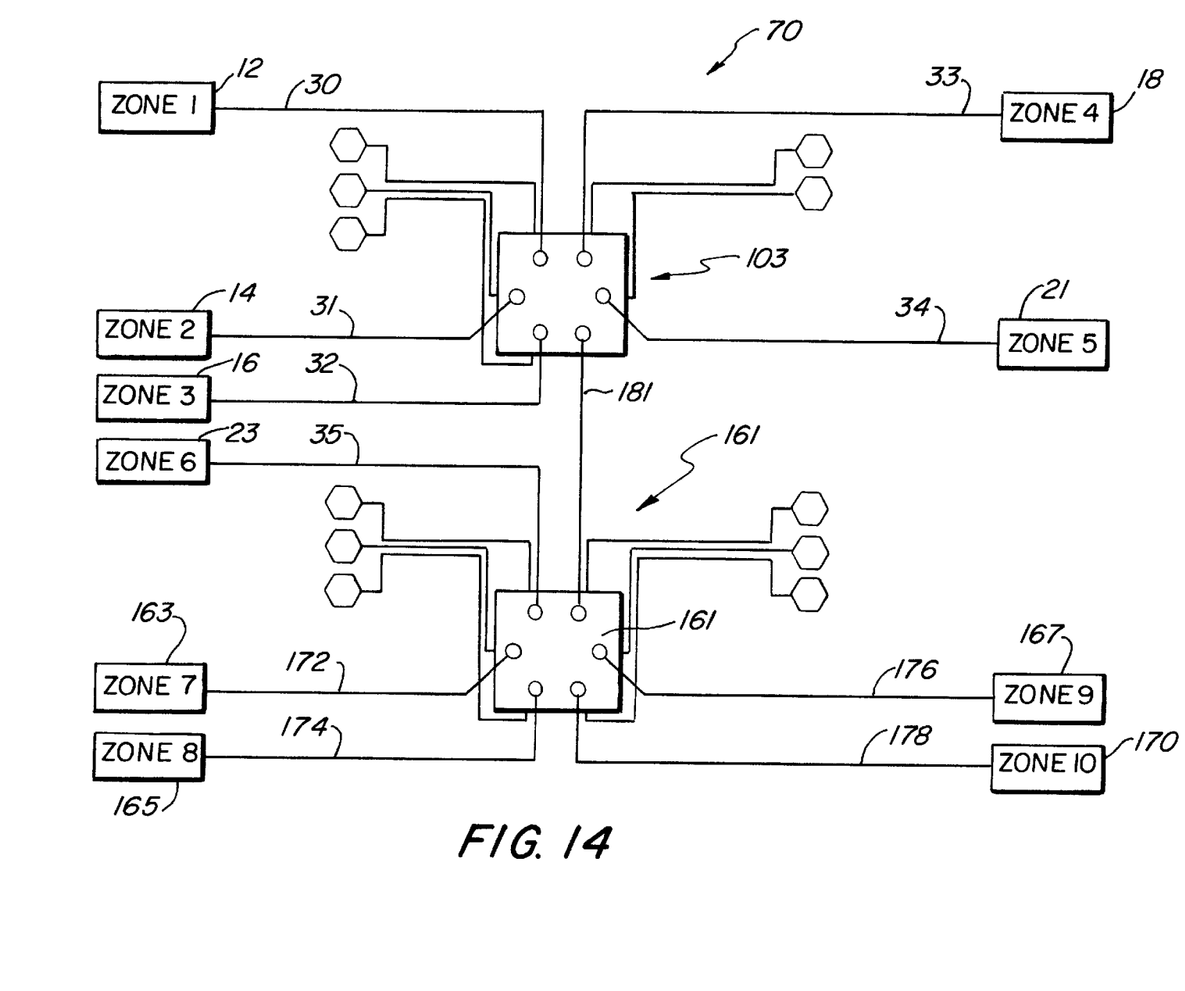
FIG. 14 is a schematic view illustrating the coupling of two distributors to accommodate ten separate zones.

Although this operation of the distributor 103 has contemplated only six zones, it will be apparent that a single distributor can accommodated any number of zones each having its own subassembly. Alternatively, additional distributors, such as that designated by the reference numeral 161 in FIG. 14, can be added to the system to accommodated additional zones. In FIG. 14, addition of the distributor 161 accommodates zones 163, 165, 167 and 170 with their associated transport tubes 172, 174, 176 and 178. In this case, a connection line 181 is provided from one of the subassemblies in distributor 103 to one of the subassemblies in the distributor 161.

With this construction, the carrier 29 might be introduced into the system 70 at the zone 21. From this point it would be moved through the transport tube 34 into the distributor 103 and through the connection tube 181 into the distributor 161. With operation of the distributor 161 in the manner previously discussed, the carrier could be moved into the transport tube 172 for transport to the zone 163, for example. Of course additional distributors, such as the distributor 161, could be added to accommodate even further zones. The advantages of a single distributor, such as the distributor 103, are multiplied with each additional distributor, such as the distributor. 161, as additional zones are added to the system 70. These advantages include a significant reduction in equipment resulting in reduced initial costs, maintenance costs, and operating costs. The reduction in square footage required by the equipment can also be appreciated in an environment where square footage is at a premium.

From the foregoing description of preferred embodiments it will be apparent that many of the advantages associated with the present invention can be achieved without departing from the spirit and scope of the invention. Therefore, it must be understood that the illustrated embodiments have been set forth only for the purposes of example and should not be taken as limiting the invention. Accordingly, one is cautioned not to limit the concept only to those embodiments disclosed, but rather to determine the scope of the invention only with reference to the following claims.

What is claimed is:

1. A pneumatic system adapted for transporting a carrier between a first transport station and second transport station, the system comprising:
   a first transport tube coupled to the first transport station;
   a second transport tube coupled to the second transport station;
   a distributor for moving the carrier from the first transport tube to the second transport tube;
   a first holding chamber included on a carousel and communicating with the first transport tube;
   a second holding chamber included on the carousel and communicating with the second transport tube; and
   the carousel included in the distributor, the carousel being rotatable on an axis for moving the carrier from the first holding chamber to the second holding chamber.

2. The pneumatic system recited in claim 1 wherein the first holding chamber of the distributor is sized and configured to receive the carrier from the first transport tube.

3. The pneumatic system recited in claim 1, further comprising:
   a storage chamber included in the carousel and being rotatably alignable with the first holding chamber to receive the carrier from the first transport station, and rotatably alignable with the second holding chamber to send the carrier to the second transport station.

4. The pneumatic system recited in claim 3, further comprising:
   a source of pressure alternatively providing a positive pressure and a negative pressure at the distributor;
   a first pneumatic conduit included in the distributor for receiving a negative pressure from the source of pressure and for applying the negative pressure to the first transport tube to move the carrier toward the first holding chamber; and
   a second pneumatic conduit included in the distributor for receiving a positive pressure from the source of pressure and for applying the positive pressure to the second transport tube for expelling the carrier from the second holding chamber and into the second transport tube.

5. The pneumatic system recited in claim 1, further comprising:
   a first valve operable between the first holding chamber and the carousel.

6. The pneumatic system recited in claim 5, further comprising:
   a second valve operable between the second holding chamber and the carousel.

7. The pneumatic system recited in claim 1 wherein the first holding chamber has a vertical axis facilitating movement of the carrier in response to a gravitational force from the first transport tube into the first holding chamber.

8. A pneumatic system for transporting a carrier between a first transport station and a second transport station, the system comprising:
   a first transport tube coupled to the first transport station;
   a second transport tube coupled to the second transport station;
   a rotary distributor coupled to the first transport tube and the second transport tube;
   a storage chamber included in the distributor and moveable between the first transport tube and the second transport tube; and
   a source of airflow coupled to the distributor to facilitate movement of the carrier through the first transport tube and into the storage chamber of the distributor, and to facilitate expulsion of the carrier from the storage chamber of the distributor and into the second transport tube.

9. The pneumatic system recited in claim 8 wherein the source of air flow includes:
   a first manifold coupled to the first transport tube and adapted to receive one of a positive pressure and a negative pressure;
   a second manifold coupled to the second transport tube and adapted to receive a positive pressure and a negative pressure;
   a first pneumatic conduit providing communication through a first valve between the first manifold and the first transport tube;
   a second pneumatic conduit providing communication through a second valve between the second manifold and the second transport tube;
   the first valve being operable to introduce the negative pressure into the first transport tube to move the carrier toward the distributor; and
   the second valve being operable to introduce a positive pressure into the second transport tube to move the carrier away from the distributor.

10. The pneumatic system recited in claim 8, further comprising:
    a first subassembly included in the distributor and having a first holding chamber communicating with the first transport tube;
    a second subassembly included in the distributor and having a second holding chamber communicating with the second transport tube; and
    the distributor being operable to move the storage chamber and the carrier between the first holding chamber of the first subassembly and the second holding chamber of the second subassembly.

11. The pneumatic system recited in claim 8 wherein the storage chamber is rotatable between the first transport tube and the second transport tube.

12. The pneumatic system recited in claim 8 wherein the source of airflow facilitates gravitational movement of the carrier from the first transport tube into the storage chamber.

13. A method for pneumatically transporting a carrier between a first transport station and a second transport station, the method comprising the steps of:
    providing a distributor coupled through a first transport tube to the first transport station and coupled through a second transport tube to the second transport station;
    providing the distributor with a table rotatable between the first transport tube and the second transport tube;
    fixing a storage chamber relative to the table;
    advancing the carrier from the first transport station through the first transport tube;
    receiving the carrier from the first transport tube in a first direction into the storage chamber of the distributor;
    rotating the table with the carrier disposed in the storage chamber between the first transport tube and the second transport tube;
    expelling the carrier from the storage chamber of the distributor in a second direction opposite to the first direction, and into the second transport tube; and
    advancing the carrier through the second transport tube to the second transport station.

14. The method recited in claim 13 further comprising the step of:
    providing the storage chamber of the distributor with a first end and a second end, the first end being generally open and the second end being generally closed.

15. The method recited in claim 14, wherein the receiving step includes the step of:
    moving the carrier inwardly of the storage chamber through the first end of the storage chamber; and
    the expelling step includes the step of moving the carrier outwardly of the storage chamber through the first end of the storage chamber.

16. A method for pneumatically transporting a carrier between a first transport station and a second transport station, including the steps of:
    providing a first transport tube coupled to the first transport station;
    providing the second transport tube coupled to the second transport station;

receiving the carrier from the first transport tube into a storage chamber at a first distribution station;

expelling the carrier from the storage chamber into the second transport tube at a second distribution station; and after the receiving step moving the storage chamber between the first distribution station and the second distribution station wherein the moving step includes the step of rotating the storage chamber between the first distribution station and the second distribution station.

17. The method recited in claim 16 wherein the rotating step includes the step of operating an indexing motor to rotate the storage chamber between the first distribution station and the second distribution station.

18. The method recited in claim 16 wherein the receiving step includes the step of applying a negative pressure to the first transport tube to move the carrier toward the first distribution station.

19. The method recited in claim 18 wherein the expelling step includes the step of applying a positive pressure to the storage chamber to move the carrier from the storage chamber toward the second transport tube at the second distribution station.

* * * * *